US009616867B2

(12) United States Patent
Lamb

(10) Patent No.: US 9,616,867 B2
(45) Date of Patent: Apr. 11, 2017

(54) VEHICLE LINE-LOCKING BRAKE SYSTEM AND METHOD

(71) Applicant: LAMB COMPONENTS, INC, Upland, CA (US)

(72) Inventor: Roger Allen Lamb, Upland, CA (US)

(*) Notice: Subject to any disclaimer, the term of this patent is extended or adjusted under 35 U.S.C. 154(b) by 0 days.

(21) Appl. No.: 14/837,969

(22) Filed: Aug. 27, 2015

(65) Prior Publication Data

US 2016/0059834 A1    Mar. 3, 2016

Related U.S. Application Data

(60) Provisional application No. 62/043,326, filed on Aug. 28, 2014.

(51) Int. Cl.
| B60T 8/26 | (2006.01) |
| B60T 11/10 | (2006.01) |
| B60T 7/08 | (2006.01) |
| B60T 11/28 | (2006.01) |

(52) U.S. Cl.
CPC .............. B60T 11/105 (2013.01); B60T 7/085 (2013.01); B60T 11/28 (2013.01)

(58) Field of Classification Search
CPC ...... B60T 17/221; B60T 13/44; B60T 13/581; B60T 11/105; B60T 11/106; B60T 8/26
USPC ............................................ 303/89; 188/265
See application file for complete search history.

(56) References Cited

U.S. PATENT DOCUMENTS

| 3,425,221 A * | 2/1969 | Canfield ................. B60T 13/52 188/152 |
| 3,550,379 A * | 12/1970 | Cox, Jr. .................. B60T 13/44 60/547.1 |
| 3,905,651 A * | 9/1975 | Hornung ................... B60T 7/12 303/13 |
| 4,192,557 A * | 3/1980 | Leiber ...................... B60T 8/46 188/181 A |
| 4,345,672 A * | 8/1982 | Nakasu ................. B60T 13/581 137/806 |
| 5,794,739 A * | 8/1998 | Ring ..................... B60T 13/581 188/153 R |
| 6,406,103 B1 * | 6/2002 | Elliott ...................... B60T 1/02 303/20 |
| 2006/0001313 A1 * | 1/2006 | Ruppert .................... B60T 8/46 303/127 |
| 2011/0175439 A1 * | 7/2011 | Mlynarczyk ............ B60T 8/175 303/20 |
| 2014/0129107 A1 * | 5/2014 | Taylor .................. B60T 13/662 701/70 |

* cited by examiner

Primary Examiner — Bradley King
Assistant Examiner — Stephen Bowes

(57) ABSTRACT

A line-locking brake system consists of a brake pressure generator which, in conjunction with a brake fluid solenoid isolates the front brake circuit from the master cylinder while maintaining a precise brake pressure in the front brake hydraulic system. The brake pressure generator consists of a pressure amplifier having a high pressure chamber located in the flow path from the master cylinder to the front brake cylinders and a low pressure chamber in fluid communication with a regulated gas pressure source. When activated, the brake pressure generator applies a pressure to the front brake circuit that is directly proportional to the pressure of the regulated gas and therefore is precisely controllable irrespective of wear on parts, driver fatigue or other variables.

5 Claims, 3 Drawing Sheets

VEHICLE LINE-LOCKING BRAKE SYSTEM AND METHOD

BACKGROUND OF THE INVENTION

This invention relates generally to drag racing equipment and in particular to methods and apparatus for locking the hydraulic braking system on drag racing vehicles.

In the sport of automotive racing, the race is begun by a starting system consisting of a series of lights of various numbers, commonly called "Christmas tree" lights. Typically, there are one to five warning lights of amber color, one green colored light to indicate the start of the race and one red light to indicate a foul start.

Before the Christmas tree is activated, the vehicles must be "staged" into the starting area. This is typically accomplished using a "line lock" device in cooperation with the vehicle's transmission brake. A line lock device typically consists of a solenoid valve that isolates the front brake hydraulic system from the master cylinder. The line lock is activated by a line lock button, usually mounted on the steering wheel, which opens and closes the solenoid, activating the line lock. In use, the vehicle driver presses on the brake pedal to apply the brakes, then engages the line lock to maintain pressure in the front brake circuit after the brake pedal is released. Locking the front brakes in such a manner allows the driver to spin the rear tires to heat them up as well as assisting in staging as discussed hereinafter.

The transmission brake, or transbrake, is a mechanism that selectively places the transmission in first and reverse gears simultaneously, effectively holding the car stationary. It is used on vehicles with automatic transmissions that employ a torque converter, where it is beneficial to build up pressure in the torque converter before the vehicle is launched. The transbrake is activated by the driver activating a solenoid in the transmission. With the transbrake engaged (transmission locked), the engine throttle can be increased to in preparation for launch without the car creeping forward. Milliseconds before the green light illuminates on the Christmas tree the transbrake is released. The power from the engine is then instantly transmitted to the wheels through first gear. This results in extremely quick acceleration of the vehicle.

Typically, a drag race car is staged by engaging the line lock device, then using the transbrake to bump the car into the starting box right before the start. Unfortunately, because the line lock device relies on the driver's foot pressure to set the initial stopping force on the front tires, the brake stopping force may not be consistent from race to race. If the stopping force is too little, the car may creep forward too quickly, leading to a false start. If the stopping force is too much, the car will not creep forward to the starting box and/or momentary release of the transbrake will cause the vehicle suspension to load up, altering the vehicle from its optimum attitude at the start.

Various methods and apparatus have been suggested for improving consistency in the operation of line locks and launch control. Published US Application US 20110175438 discloses a Vehicle Line-Locking Braking System and Method incorporating a computer that performs various status checks before enabling the line locking device. US Patent Application 20140129107 discloses a brake system for a vehicle that includes a wheel hold mode in which the wheel brake pressure is maintained at the wheels of the non-driven axle alternatively by depressing the brake pedal or by engaging the Antilock Brake System (ABS) pump. The prior art solutions add significant complexity with concomitant reduction in reliability.

What is needed, therefore, is a method and apparatus for applying a consistent, repeatable, brake pressure to the front brakes of a vehicle equipped with a line locking device, without adding significant weight or complexity to the brake system.

SUMMARY OF THE INVENTION

The present invention solves the foregoing need by providing a brake pressure generator which, in conjunction with a line-locking device used to isolate the front brake circuit from the master cylinder, maintains a precise brake pressure in the front brake hydraulic system. According to one embodiment of the invention, the brake pressure generator comprises a pressure amplifier consisting of a low pressure chamber, a high pressure chamber and a dual-diameter piston. The high pressure chamber of the brake pressure generator is located in the flow path from the master cylinder to the front brake cylinders between the line-locking device and the front brake cylinders. The low pressure chamber of the brake pressure generator is in fluid communication with a pressure regulator that receives pressurized air, carbon dioxide or other stored gas used to operate the vehicle air shifter, parachute mechanism or other auxiliary systems. An air solenoid selectively allows or prevents the pressurized gas from reaching the low pressure chamber of the brake modulator. The air solenoid is preferably actuated by the same electrical trigger as the line locking device.

In operation, prior to staging, the driver engages the line lock (with or preferably without applying foot pressure to the brake system). The solenoid valve of the line lock isolates the front brake circuit from the master cylinder. Simultaneously, the air solenoid opens to allow pressurized gas to enter the low pressure chamber of the brake pressure generator. Pressurized gas acting on the piston in the low pressure chamber then pressurizes the isolated front brake system to a hydraulic pressure that is precisely equal to the gas pressure leaving the regulator multiplied by the area ratio between the two diameters of the dual-diameter piston. This ensures that the hydraulic pressure in the front brake system is precisely controlled and repeatable race after race without the added cost or complexity of computer controls, electronic timers, ABS pumps, or other cumbersome apparatus of the prior art.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
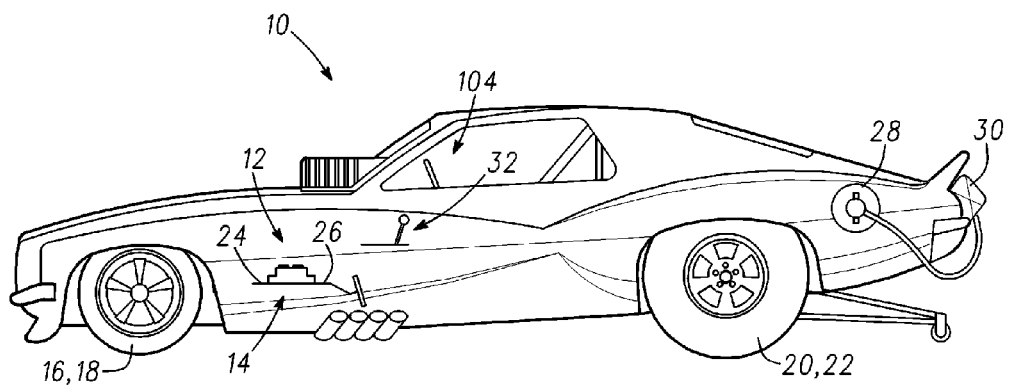
FIG. 1 is an illustration of a vehicle equipped with a hydraulic braking system incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to the drawing figures and in particular, FIG. 1, a typical drag race car 10 is equipped with a brake system 12 consisting of a brake master cylinder 14 and at least one brake piston at each wheel 16, 18, 20, 22, each brake piston operating on the rotor of a disk brake to apply a stopping force to the wheel. Typically brake master cylinder 14 has two independent hydraulic circuits. The front hydraulic circuit 24 operates the front brake pistons 16, 18 and the rear hydraulic circuit 26 operates the rear brake pistons 20, 22. Typically, the car 10 is also equipped with a pressurized gas bottle 28, which provides a source of gas to operate the parachute pack 30, air shifter 32 or other vehicle auxiliary systems.

Figure 2:
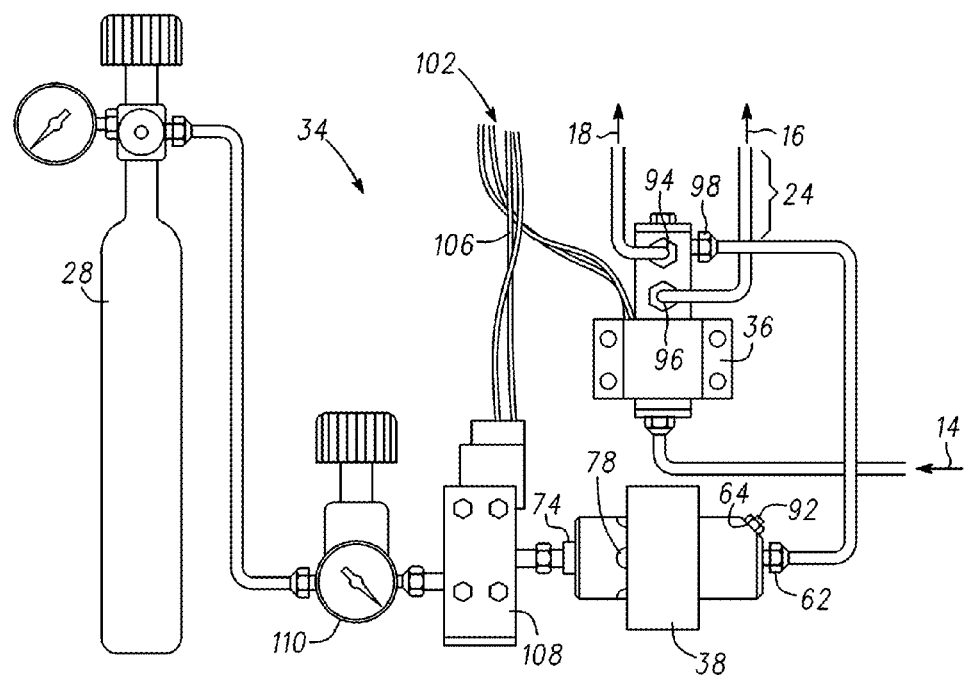
FIG. 2 is a diagram of a brake hydraulic system incorporating features of the present invention.

With additional reference to FIG. 2, a line-lock apparatus 34 incorporating features of the present invention comprises a brake fluid solenoid (line lock) 36 and a brake pressure generator 38. Brake fluid solenoid 36 is operatively attached to the front hydraulic circuit 24. When activated, brake fluid solenoid 36 closes to isolate front brake pistons 16, 18 from master cylinder 14.

Figure 3:
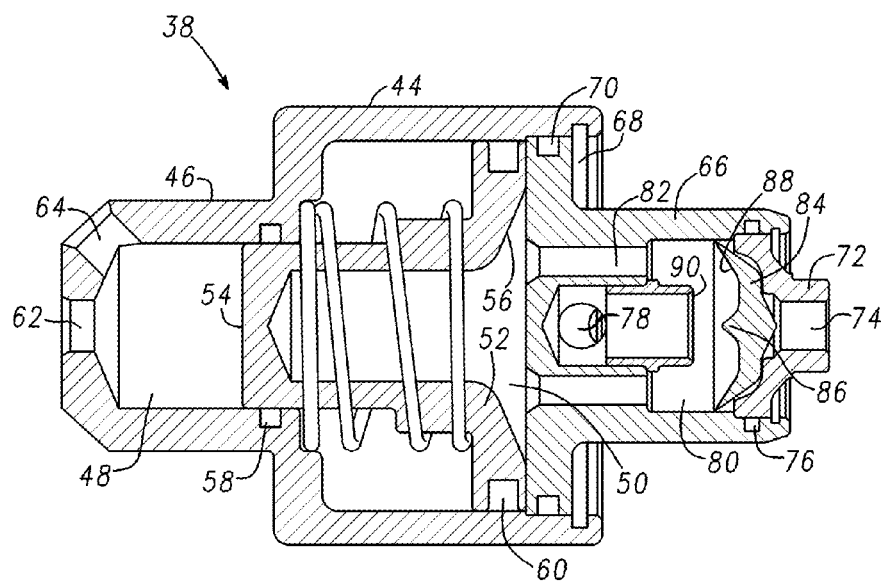
FIG. 3 is a cross-sectional view of a brake pressure generator used in connection with the hydraulic braking system incorporating features of the present invention in a deactivated state.

With additional reference to FIG. 3, brake pressure generator 38 comprises a hydraulic amplifier 44 which consists of a lower body 46 having a high pressure chamber 48 and a low pressure chamber 50. A dual-diameter piston 52 is disposed within lower body 46 so that the small piston surface 54 is disposed in high pressure chamber 48 and large piston surface 56 is disposed in low pressure chamber 50. Sealing rings 58, 60 seal piston 52 to chambers 48 and 50, respectively. High-pressure chamber 48 includes a pair of fluid ports 62 and 64.

Brake pressure generator 38 further comprises an upper body 66 which is attached to lower body 46 by means of a conventional snap ring engaging a groove 68 formed in lower body 46 and sealed to lower body by means of a sealing ring 70. Inlet housing 72, which includes air inlet port 74 is similarly attached to upper body 66 by means of a conventional snap ring and a sealing ring 76. Upper body 66 includes a plurality of exhaust apertures 78 which vent inner chamber 80 to the outside, and a plurality of longitudinal passageways 82 which provide fluid communication between inner chamber 80 and low pressure chamber 50. A sealing member 84 is disposed within inner chamber 80. Sealing member 84 comprises an axisymmetric resilient member, preferably made from Nitrile, Fluorocarbon or other elastomer, having a "batwing" profile consisting of a substantially conical raised center portion 86 and a substantially cup-shaped perimeter portion 88. Sealing member 84 is disposed within inner chamber 80 oriented so that the concave surface of the cup-shaped perimeter portion 88 and the raised portion face toward valve seat 90.

With reference again to FIG. 2, fluid port 62 of brake pressure generator 38 is operatively attached to one of the common fluid ports 94, 96, 98 of brake fluid solenoid 36, with the remainder of common fluid ports 94, 96, 98 connected to front hydraulic circuit 24. A bleed screw 92 is attached to fluid port 64 to enable high pressure chamber 48 of brake pressure generator 38 to be bled of any residual air using master cylinder 14 as the source of fluid (via brake fluid solenoid 36, which in its inactive position simply acts as a manifold). Alternatively, if brake pressure generator is mounted in a vertical orientation, bleed screw 92 is attached to fluid port 62, while fluid port 64 is operatively attached to brake fluid solenoid 36.

Air inlet port 74 is operatively attached to air solenoid 108, which receives a flow of regulated air from gas bottle 28 via air pressure regulator 110. Air pressure regulator 110 is adjustable to provide a precisely controlled gas pressure to air inlet port 74.

In operation, the racecar driver operating drag race car 10 stages the car 10 by gently applying foot pressure to the brake pedal, which causes master cylinder 14 to pump brake fluid into front hydraulic circuit 24 and rear hydraulic circuit 26, which causes brake pistons 16, 18, 20 and 24 to apply a braking force to the front and rear wheels. Alternatively, the car 10 can be staged without applying any foot pressure to the brake pedal at all, although the alternative operation will consume somewhat more of the vehicle's stored pressurized gas. The driver then activates the line lock apparatus 34, typically by means of a button 102 located on steering wheel 104, which sends an electrical signal through wire bundle 106. This action immediately activates brake fluid solenoid 36 which moves from an open position to a closed position to isolate front brake pistons 16, 18 from master cylinder 14. The driver can then release the foot pressure on the brake pedal (if the brake pedal was applied).

Figure 4:
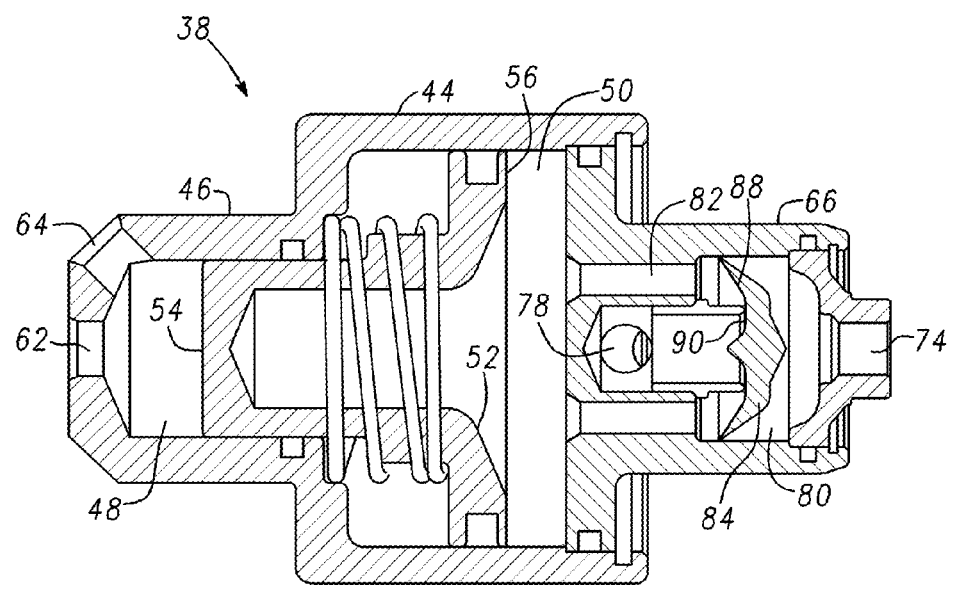
FIG. 4 is a cross-sectional view of the brake pressure generator of FIG. 3 in an activated state.

Simultaneously, or shortly thereafter, air solenoid 108 is activated and moves from a closed position to an open position to allow a flow of regulated air from gas bottle 28 to enter air inlet port 74 of hydraulic amplifier 44. As shown in FIG. 4, gas pressure action on sealing member 84 causes it to move to close off valve seat 80, thereby closing exhaust ports 78 so that the remaining gas pressure will pass through longitudinal passageways 82 and enter low pressure chamber 50. The force of the gas acting on the large piston surface 56 of piston 52 applies a pressure on the brake fluid in high-pressure chamber 48 that is equal to the ratio of the area of large piston surface 56 divided by the area of small piston surface 54. Preferably the hydraulic amplification is from 300% to 700%, however, in the illustrative in sample, the area of large piston surface 56 is five times the area of small piston surface 54 and therefore the hydraulic pressure in high pressure chamber 48 (and therefore in front hydraulic circuit 24) is five times the gas pressure in low pressure chamber 52 (500% hydraulic amplification). The invention is not, however, limited to a particular amplification ratio. Because the pressure of the regulated air from gas bottle 28 can be precisely controlled, the brake fluid pressure in high-pressure chamber 48 (and therefore front brake pistons 16, 18) can be precisely controlled race after race regardless of component wear, driver fatigue, or other variables that would lead to inconsistent brake force applied to the front wheels. With the brake force on the front wheels precisely controlled and repeatable, the driver is able to stage the car precisely using the transbrake without fear of over creeping, or loading the suspension prior to start.

When line lock apparatus 38 is released milliseconds before the start, air solenoid 108 and brake fluid solenoid 36 are deactivated. As air solenoid 108 begins to vent, the gas pressure in low pressure chamber 50 unseats sealing member 84 from valve seat 90. This opens gas communication between inner chamber 80 and the atmosphere via exhaust apertures 78, which are designed to have significantly more flow area than gas inlet port 74. With exhaust apertures 78 open, gas pressure in low pressure chamber is vented almost instantaneously and is vented independent of such variables as the operational characteristics of air solenoid 108, the length and/or diameter of the tubing between air solenoid 108 and brake pressure generator 38 or other factors that would cause the release time to vary.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment the brake modulator has a hydraulic amplification of 500% other amplification ratios, greater or less than 100% are considered within the scope of the invention. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term_____is defined to mean_____").

What is claimed is:

1. A line locking apparatus for locking the hydraulic front wheel brake system of a vehicle, the hydraulic front wheel brake system comprising a brake master cylinder, a plurality of front brake pistons and hydraulic tubing attached between the brake master cylinder and the plurality of front brake pistons, the line locking apparatus comprising:
a brake fluid solenoid operatively disposed between the brake master cylinder and the plurality of front brake pistons, the brake fluid solenoid moveable between an open and a closed position for isolating the plurality of front brake pistons from the brake master cylinder;
a brake pressure generator operatively disposed between the brake fluid solenoid and the plurality of front brake pistons, the brake pressure generator moveable between two selectable states, wherein in the first selectable state, the brake pressure generator applies no hydraulic pressure to the plurality of front brake pistons and in the second selectable state, the brake pressure generator applies a predetermined hydraulic pressure to the plurality of front brake pistons, the brake pressure generator comprising a hydraulic amplifier having a high pressure chamber and a low pressure chamber, the high pressure chamber being operatively disposed between the brake fluid solenoid and the plurality of front brake pistons, the low pressure chamber having an inlet port for receiving a flow of pressurized fluid to create pressure in the low pressure chamber, the low pressure chamber having a plurality of exhaust ports for discharging the pressure in the low pressure chamber, the plurality of exhaust ports being configured so that the collective cross sectional flow area of the plurality of exhaust ports are greater than the flow area of the inlet port; and
a driver interface enabling the driver to selectively move the brake fluid solenoid from the open position to the closed position and move the brake pressure generator from the first state to the second state, whereby the hydraulic front wheel brake system is isolated from the brake master cylinder and a predetermined hydraulic pressure is applied to the hydraulic front wheel brake system, the driver interface further enabling the driver to selectively move the brake pressure generator from the second state to the first state, whereby the pressure in the low pressure chamber is exhausted rapidly through the at least one exhaust port and the predetermined hydraulic pressure is rapidly released from the front wheel brake system.

2. The line locking apparatus of claim 1, wherein:
the hydraulic amplifier includes a dual-diameter piston, the-dual diameter piston having a large surface disposed in the low pressure chamber and a small surface disposed in the high pressure chamber.

3. The line locking apparatus of claim 1, further comprising:
a pressure vessel for supplying a source of compressed gas;
a pressure regulator operatively attached between the pressure vessel and the inlet port of the hydraulic amplifier for supplying a source of regulated fluid pressure to the low pressure chamber of the hydraulic amplifier.

4. The line locking apparatus of claim 3, further comprising:
an air solenoid operatively disposed between the pressure vessel and the inlet port of the hydraulic amplifier, the air solenoid moveable between an open and closed position for selectively providing gas pressure to the low pressure chamber of the hydraulic amplifier.

5. The line locking apparatus of claim 4, wherein:
the hydraulic amplifier has an amplification ratio of 300-500%.

* * * * *